United States Patent [19]

Wichelhaus et al.

[11] Patent Number: 4,528,149
[45] Date of Patent: Jul. 9, 1985

[54] HOLLOW SPHERICAL BODIES OF SOLIDIFIED ALKALI METAL SILICATE

[75] Inventors: Winfried Wichelhaus, Mettmann; Christine Schröder, Düsseldorf, both of Fed. Rep. of Germany

[73] Assignee: Henkel Kommanditgesellschaft auf Aktien, Dusseldorf, Fed. Rep. of Germany

[21] Appl. No.: 567,400

[22] Filed: Dec. 30, 1983

[30] Foreign Application Priority Data

Apr. 20, 1983 [DE] Fed. Rep. of Germany ....... 3314259

[51] Int. Cl.³ ............................... C03C 19/10
[52] U.S. Cl. ...................... 264/13; 428/404; 106/75; 501/39; 264/5
[58] Field of Search ............ 428/404; 106/75; 501/39; 264/5, 13

[56] References Cited

U.S. PATENT DOCUMENTS

| | | | |
|---|---|---|---|
| 2,978,340 | 4/1961 | Veatch et al. | 106/75 |
| 3,458,332 | 7/1969 | Alford et al. | 106/75 |
| 3,699,050 | 10/1972 | Henderson | 106/75 |
| 3,838,998 | 10/1974 | Matthews et al. | 501/39 X |
| 3,993,578 | 11/1976 | Gerontopoulos et al. | 264/5 |
| 4,059,423 | 11/1977 | De Vos et al. | 106/75 X |
| 4,162,166 | 7/1979 | Walls-Muycelo | 106/75 X |
| 4,336,338 | 6/1982 | Downs et al. | 106/75 X |

*Primary Examiner*—George F. Lesmes
*Assistant Examiner*—Nancy A. B. Swisher
*Attorney, Agent, or Firm*—Ernest G. Szoke; Nelson Littell, Jr.

[57] ABSTRACT

Hollow, spherical bodies of solidified alkali metal silicates having the general formula $$M_2O : x . SiO_2$$

where M is an alkali metal and x has a value greater than 3.6 and less than 12, said hollow bodies having an external diameter of from 1 to 5 mm, shell thickness of from 0.2 to 0.6 mm, a water content of from 10% to 30% by weight and a solids content of at least 70% by weight, the $M_2O$ content of the shell of said hollow bodies being greater internally and less toward the exterior surface, as well as the process of producing said hollow, spherical bodies of solidified alkali metal silicate. The hollow spheres are expandable resulting in the formation of foam spheres having a loose surface. The hollow spheres are useful to give a uniform filling of narrow cavities and in the covering of liquids by floatable, optionally surface-active silicate-containing materials.

17 Claims, No Drawings

HOLLOW SPHERICAL BODIES OF SOLIDIFIED ALKALI METAL SILICATE

BACKGROUND OF THE INVENTION

This invention relates to spherical, expandable hollow bodies of solidified alkali metal silicate solutions, to processes for their production and to their use.

In the context of the invention, solidified alkali metal silicate solutions are understood to be the products formed by the reaction of alkali metal silicate solutions with so-called hardeners. Known hardeners are, in particular, carboxylic acids and their derivatives, such as the corresponding esters, acid chlorides and amides. Other known hardeners include ammonium salts and salts of polyvalent metals, mineral acids and acid salts thereof and also hexafluorosilicates.

The hardening process can be controlled through the choice of the hardener. Slow reactions are obtained above all with the carboxylic acid derivatives and with hexafluorosilicates. Rapid solidification is obtained when mineral acids and salts of polyvalent metals are used.

These processes have been repeatedly described in the literature and have also been used for producing foam bodies of waterglass or porous granulate-containing bodies which, by virtue of their low density, are of interest as fillers and insulating materials.

OBJECTS OF THE INVENTION

An object of the present invention is to produce a spherical hollow body of solidified alkali metal silicate having an external diameter of at least 0.5 mm. This spherical hollow body of solidified alkali metal silicate solutions is further characterized in that it consists of a shell closed on all sides and, in the optimal case, is a hollow sphere.

Another object of the present invention is the production of hollow, spherical bodies of solidified alkali metal silicates having the general formula $$M_2O \cdot x \cdot SiO_2$$

where M is an alkali metal and x has a value greater than 3.6 and less than 12, said hollow bodies having an external diameter of from 1 to 5 mm, shell thickness of from 0.2 to 0.6 mm, a water content of from 10% to 30% by weight and a solids content of at least 70% by weight, the $M_2O$ content of the shell of said hollow bodies being greater internally and less toward the exterior surface.

A further object of the present invention is the development of a process for the production of hollow, spherical bodies of solidified alkali metal silicates having the general formula $$M_2O \cdot x \cdot SiO_2$$

where M is an alkali metal and x has a value greater than 3.6 and less than 12, said hollow bodies having an external diameter of from 1 to 5 mm, shell thickness of from 0.2 to 0.6 mm, a water content of from 10% to 30% by weight and a solids content of at least 70% by weight, the $M_2O$ content of the shell of said hollow bodies being greater internally and less toward the exterior surface consisting essentially of the steps of introducing an alkali metal silicate solution dropwise into a solution of a hardener for an alkali metal silicate solution which has a density of slightly lower then the density of the alkali metal silicate solution, heat treating the solid product obtained in a solution of a hardener for an alkali metal silicate solution, and separating and recovering said hollow spherical bodies of solidified alkali metal silicates.

These and other objects of the present invention will become more apparent as the description thereof proceeds.

DESCRIPTION OF THE INVENTION

It has now been found that hollow, spherical bodies of solidified alkali metal silicates having the general formula $$M_2O \cdot x \cdot SiO_2$$

where M is an alkali metal and x has a value greater than 3.6 and less than 12, said hollow bodies having an external diameter of from 1 to 5 mm, shell thickness of from 0.2 to 0.6 mm, a water content of from 10% to 30% by weight and a solids content of at least 70% by weight, the $M_2O$ content of the shell of said hollow bodies being greater internally and less toward the exterior surface can be obtained by reaction alkali metal silicate solutions with solutions of hardeners for alkali metal silicate solutions using the procedure described hereinafter. The process is characterized in that an alkali metal silicate solution is introduced dropwise into a hardener solution, after which the product accumulating is heat-treated in the original hardener solution or in another hardener solution and thereafter is separated off. The heat treatment may be carried out by boiling in the hardener solution.

More particularly, the present invention relates to a process for the production of hollow, spherical bodies of solidified alkali metal silicates having the general formula $$M_2O \cdot x \cdot SiO_2$$

where M is an alkali metal and x has a value greater then 3.6 and less than 12, said hollow bodies having an external diameter of from 1 to 5 mm, shell thickness of from 0.2 to 0.6 mm, a water content of from 10% to 30% by weight and a solids content of at least 70% by weight, the $M_2O$ content of the shell of said hollow bodies being greater internally and less toward the exterior surface, consisting essentially of the steps of introducing an alkali metal silicate solution dropwise into a solution of a hardener for an alkali metal silicate solution which has a density of slightly lower than the density of the alkali metal silicate solution, heat treating the solid product obtained in a solution of a hardener for an alkali metal silicate solution, and separating and recovering said hollow spherical bodies of solidified alkali metal silicates.

It has proved to be of advantage for the ratio between the density of the alkali metal silicate solution and the density of the hardener solution to amount to between 1.02 and 1.2 and preferably to between 1.02 and 1.1. Suitable alkali metal silicates are sodium, potassium or lithium silicates. Mixtures of alkali metal silicate solutions may also be used. Alkali metal silicate solutions in which the $SiO_2$ content in the alkali metal silicate solution amounts to between 25% and 34% by weight are particularly suitable.

The external diameter of the hollow beads obtained by the process described above is determined by the droplet size, i.e. the diameter of the hollow sphere is substantially identical with that of the droplet from which it was produced. Any deviations emanate above all from the shape of the droplets. Accordingly, more exact comparison values are the volumes (sphere volume and droplet volume).

Hollow spheres having an external diameter of from 1 to 5 mm may be produced without difficulty. The wall thickness of the spherical hollow bodies is preferably regulated through the silicate content of the alkali metal silicate solution. Wall thicknesses of from 0.2 to 0.6 mm are obtained with standard commercial-grade alkali metal silicate solutions (waterglass solutions). Other wall-thickness values may be obtained by using modified alkali metal silicate solutions.

The upper limit to the $SiO_2$ content is determined primarily by the viscosity. So far as the process according to the invention is concerned, viscosity ranges of from 50 to 2500 mPa.s are particularly appropriate. With regard to the limits to the concentration of the hardener solution, the two stages of the production process have to be viewed separately. In the first stage, which comprises droplet formation and stabilization, it is important that, in addition to a hardening effect, the hardener solution should have a high density which should only be slightly lower than the density of the alkali metal silicate solution. Accordingly, the solutions used are characterized by a ratio between the density of the alkali metal silicate solution to the density of the hardener solution in the above-mentioned range of from 1.02 to 1.2 and preferably from 1.02 to 1.1.

Where the droplets are large, low density ratio values are of advantage because, in that case, deformation of the droplets can be avoided. Small droplets are easier to stabilize and, accordingly, may even by obtained despite fairly significant differences in density. The necessary densities are achieved through high salt concentrations in the hardener solutions. These concentrations are always sufficient for hardening itself.

The second stage, in which the hollow spheres formed are solidified, requires not only the hardening effect of the solution, but also a sufficiently high boiling point of the solution. An adequate increase in boiling point is obtained in particular at high salt concentrations. Accordingly, the boiling point of the solutions should be between 103° and 120° C. and preferably 110° and 115° C.

For the first stage of the process, the ratio by volume of hardener solution to alkali metal silicate solution should be selected in such a way that, on completion of the dropwise addition, the droplets are still completely wetted by the hardener solution. Accordingly, ratios beyond about 1:1 are particularly suitable.

In the second stage of the process, uniform wetting is also an important requirement for solidification. Wetting can be complicated by the floating of the hollow spheres. In that case, the layer of hollow spheres floating on the hardener solution should on average be no thicker than a triple layer. This ensures that, on boiling, the spheres constantly change place and each sphere is adequately wetted.

If a favorable ratio by volume between the hardener solution and the hollow spheres is to be obtained, the hardener solution must have a large surface. In cases where wide vessels filled to low levels are used, the lower limit to the ratio by volume of hardener solution to alkali metal silicate solution should be at about 2:1. By adopting technical measures, such as for example mechanical circulation of the hollow spheres, it is possible to obtain adequate hardening even with other ratios by volume.

Since, during solidification of the hollow spheres, $Na_2O$ is given off therefrom to the hardener solution, increasing its pH-value, acids have to be added, particularly where the above-mentioned ratio by volume assumes low values. In that case, the pH-value should be kept in the range from pH 4 to pH 10.

Aqueous solutions of calcium salts, such as in particular calcium chloride and calcium nitrate, have proved to be particularly effective hardener solutions. They may be used both in the first stage and also in the second stage of the process. However, other compounds may also be used, as can be seen from the following Examples and from Table 1. The modification of stage 2 of the claimed process may not only lie in the use of different compounds as hardeners, but also in differences in concentration, for example of the calcium chloride, between the first and second stages of the process.

In practice, formation of the spherical hollow body involves several intermediate stages because, initially, the surface skin is stabilized and spheres filled with liquid waterglass are formed as intermediate product. Heating of the solutions in the boiling range accelerates hardening and, after sufficiently long heating, the hollow spheres are completely solidified.

The process according to the invention is characterized by the increase in the $SiO_2:M_2O$ ratio ($M_2O$ = alkali metal oxide) in the solidified hollow spheres by comparison with the alkali metal silicate solution used. As Example 2 shows, hollow spheres characterized by a ratio by weight of $SiO_2$ to $Na_2O$ of 5.2 are obtained where soda waterglass having a ratio by weight of $SiO_2$ to $Na_2O$ of 3.4 is used. However, it is also possible to adjust to other ratios by weight. Important influencing factors in this respect include the ratio of $SiO_2$ to $Na_2O$ in the alkali metal silicate solution used, the duration of the heat treatment and the pH-value of the hardener solution. Thus, it is possible by the process according to the invention to produce hollow spheres which, so far as the principal constituents are concerned, have the following composition (in % by weight): $SiO_2$: 55 to 75, $M_2O$: 10 to 15, $H_2O$: 10 to 30.

As element distribution images obtained by X-ray fluorescence techniques using a scanning electron microscope show, the alkali metal oxide is not uniformly distributed in the shell of the spherical hollow bodies. On the contrary, the $M_2O$ content always decreases outwards. The extent to which $M_2O$ is depleted in the outer layer of the spherical shell depends upon the treatment in the hardener solution. In the event of prolonged heating in acidic hardener solutions, the hollow spheres obtained have a surface layer which is free from $M_2O$. The hollow spheres thus treated show high resistance to moisture.

In addition, the use of the spherical hollow bodies according to the invention is recommended for any application which requires a closed, low-density sphere instead of compact solidified waterglass or porous foam granulate. Typical applications include, for example, the uniform filling of narrow cavities and the covering of liquids by floatable, optionally surface-active silicate-containing materials.

While the process according to the invention provides for a whole range of possible modifications both in regard to the hardeners and in regard to the thermal aftertreatment, it is also readily possible to produce expanded products. These expanded spheres may be produced by processes which use the water content of the solidified alkali metal silicate solution as gas donor for the expansion process. One process suitable for this purpose comprises, for example, brief heating to temperatures in the range from 200° to 400° C. The process may also be varied to the extent that modifying components, such as acids, salt solutions or dispersions, are added in such a way that, before the expension process, the spherical hollow body according to the invention is wetted or coated with one or more modifying components. Since the form and dimensions of the hollow body promote application of the modifying component, excellent, uniform distribution of the modifying component on the surface of the hollow bodies may be obtained with reasonable economy. Further advantages over other embodiments include the fact that the spherical form remains intact during the expansion process and the fact that all the spheres are expanded to substantially the same extent. In addition, the end product has a very low powder density.

The invention is illustrated by but in no way limited to the following Examples.

EXAMPLE 1

931 g of $CaCl_2.6H_2O$ and 176 g of NaCl were dissolved in 2.5 liters of water. 100 ml of a waterglass solution containing 8.2% by weight of $Na_2O$ and 26.9% by weight of $SiO_2$ were introduced dropwise into the resulting solution over a period of 10 minutes. The solution was then heated to boiling temperature. After 30 minutes, the hollow spheres floating on the solution were skimmed off with a sieve and washed with water.

The spheres obtained had a hard shell with a rough surface. The sphere diameter was on average 3.5 mm and the wall thickness of the shell approximately 0.5 mm. The interior of the spheres was free from waterglass solution.

EXAMPLE 2

40 ml of a standard commercial waterglass solution containing approximately 27% by weight of $SiO_2$ and approximately 8% by weight of $Na_2O$ were added dropwise to 400 ml of a 4 molar $CaCl_2$-solution in a glass beaker. The solution was heated to boiling temperature in 10 minutes and kept at that temperature for 35 minutes. The hollow spheres formed were then filtered off and washed. Analysis of the air-dry hollow spheres produced the following values in % by weight for the constituents: $SiO_2$=68.7; $Na_2O$=1.32; CaO=1; NaCl=0.7; $H_2O$=17.3.

EXAMPLE 3

20 ml of a waterglass solution containing 350 g of $SiO_2$/l and having a molar ratio of $SiO_2$ to $Na_2O$ of 3.46 were added dropwise from a pipette to a glass beaker with a filter insert which was filled with 200 ml of a 4.1 molar $CaCl_2$ solution. The droplets collected on the bottom of the filter insert, being surrounded by a stabilizing surface skin. The droplets were transferred by means of the filter insert to a second glass beaker which contain 200 ml of a solution of 1.7 moles of $CaCl_2$ and 1.2 moles of NaCl per liter and in which they were boiled for 30 minutes. Hard spheres were formed and were removed from the solution in the filter insert and washed with water. 12.3 g of hollow spheres were left behind after drying at 120° C.

EXAMPLE 4

Some possible variations to the alkali metal silicate solutions and to the hardener solutions are shown in Tables 1 to 3 below. Sodium silicate solutions commercially available as type 37/40 solutions were used in the tests summarized in Table 1. The sodium silicate solutions has a density (g/cc) of 1.35, a viscosity range of 50 to 100 mPa.s and a solids content of 26.9% by weight of $SiO_2$ and 8% by weight of $Na_2O$. In the first stage of the process, 100 ml of 4.1 molar $CaCl_2$ solution was always initially introduced as hardener solution 1, unless otherwise indicated. 10 ml of the particular waterglass solution was then added dropwise thereto. The boiling time in the thermal aftertreatment carried out in hardener solution 2 was 30 minutes. The composition of the hardener solution and also the density and working temperature are shown in Table 1 under "hardener solution stage 1". The column headed "hardener solution stage 2" indicates the procedure adopted in that stage and shows whether the hardeners used were the same as or different from those used in stage 1. Finally, Table 1, right-hand column, shows the external diameters and surface quality of the hollow spheres.

TABLE 1

| Test No. | Hardener solution stage 1 composition (mols/l) | density (g/cc) | T (°C.) | Hardener solution stage 2 composition (mols/l) | T (°C.) | Hollow spheres external diameter (mm) | surface |
|---|---|---|---|---|---|---|---|
| 1 | $CaCl_2$; 4.1 | 1.33 | 25 | as stage 1 | 114 | 1.2–1.5 | smooth |
| 2 | $CaCl_2$; 4.1 | 1.33 | 25 | as stage 1 | 114 | 2.0–2.1 | smooth |
| 3 | $CaCl_2$; 4.1 | 1.33 | 70 | as stage 1 | 114 | 2.5–2.7 | smooth |
| 4 | $CaCl_2$; 4.1 | 1.33 | 25 | $NaHCO_3$; 8.6 | 102 | 3.3–3.5 | porous |
| 5 | $BaCl_2$; 1.5 | 1.26 | 25 | $CaCl_2$; 4.1 | 114 | 3.0–3.2 | smooth |
| 6 | $MgCl_2$; 4.0 | 1.28 | 25 | as stage 1 | 103 | 2.9–3.0 | porous |
| 7 | $Co(NO_3)_2$; 2.0 | 1.22 | 25 | as stage 1 | 103 | 3.0–3.3 | rough |
| 8 | $CaCl_2$; 2.0 | 1.11 | 25 | $CaCl_2$; 4.1 | 114 | 3.3–3.5 | rough |

Tests 9 to 11 summarized in Table 2 were carried out using sodium silicate solutions which had a solids content of 22.3% by weight of $SiO_2$ and 5.8% by weight of $Na_2O$ for a density of 1.26 and a viscosity range of from 10 to 30 mPa.s. In test 9, the density of hardener solution 1 (1.32) is higher than the density of the alkali silicate solution (1.26) and no sphere formation was obtained. By contrast, the required products can be obtained under appropriately modified conditions, as tests 10 and 11 show.

Tests (a) to (e), summarized in Table 3, were carried out using various alkali metal silicate solutions, all of which had the densities shown. The hardener solution of stage 1 was $CaCl_2$ in a concentration sufficient to give a density of about 0.1 g/cc less than the density of the alkali metal silicate solution. The first stage was conducted at 25° C. Thereafter, the spheres were removed and immersed in the hardener solution of stage 2 as indicated and heated for 30 minutes at a temperature as indicated.

TABLE 2

| Test No. | Hardener solution stage 1 | | | Hardener solution stage 2 | | Result |
|---|---|---|---|---|---|---|
| | composition (mols/l) | density (g/cc) | T (°C.) | composition (Mols/l) | T (°C.) | |
| 9 | $CaCl_2$; 4.0 | 1.32 | 25 | as stage 1 | 114 | no sphere formation |
| 10 | $CaCl_2$; 3.2 | 1.22 | 25 | as stage 1 | 113 | sphere formation |
| 11 | $CaCl_2$; 2.0 | 1.14 | 25 | as stage 1 | 108 | sphere formation |

EXAMPLE 7

The procedure was as in Example 2, except that the boiling time was shortened to 15 minutes. The hollow spheres were then skimmed off with a sieve and tempered for 5 minutes at 120° C. in a glycerol bath to which 10% of water had been added. The hollow spheres underwent an increase in volume of approximately 50% during this heat treatment.

EXAMPLE 8

0.2 liter of the waterglass solution used in Example 3 were added dropwise at room temperature to 0.7 liter of a 4 molar $CaCl_2$ solution. The solution was heated and subsequently kept at boiling temperature for 30 minutes. The hollow spheres were then filtered off, washed and dried in air. The yield amounted to 130 g. The hollow spheres had an average diameter of 3.5 mm, wall thicknesses of from 0.4 to 0.6 mm and an apparent density of 0.54 g/cc.

TABLE 3

| Test No. | Alkali metal silicate solution | | | Density g/cc | Hardener solution stage 2 Hardener | T °C. | Properties of the spherical hollow body |
|---|---|---|---|---|---|---|---|
| | $SiO_2$ % by weight | $M_2O$ % by weight | | | | | |
| (a) | 27 | $Na_2O$ | 8 | 1.35 | 100 ml of 13% NaCl solution + 10 ml of diethyl malonate | 103 | rough surface, low strength |
| (b) | 23.7 | $K_2O$ | 10.7 | 1.32 | 100 ml of $H_2O$ + 37 g of $CaCl_2.6 H_2O$ + 7g of NaCl | 104 | rough surface, medium strength, wall thickness approx. 0.2–0.4 mm |
| (c) | 20.4 | $K_2O$ $Li_2O$ | 7.8 1.4 | 1.26 | 100 ml of $H_2O$ + 37 g of $CaCl_2.6 H_2O$ + 7g of NaCl | 104 | rough surface, medium strength, wall thickness approx. 0.2–0.4 mm |
| (d) | 27 | $Na_2O$ | 8 | 1.35 | 100 ml of 4 m $CaCl_2$ solution + 5 ml of 2 m acetic acid | 113 | smooth surface, high strength |
| (e) | 23 | $Na_2O$ | 6.8 | 1.26 | 100 ml of 4 m $CaCl_2$ solution + 5 ml of 2 m acetic acid | 113 | smooth surface, medium strength, wall thickness approx. 0.2–0.4 mm |

Hardener solution Stage 1:
(a) and (d):4.1 m $CaCl_2$-solution
(b) and (c) and (e):3.2 m $CaCl_2$-solution

EXAMPLE 5

A few drops of a surfactant solution were added to 300 ml of a 4 molar $Ca(NO_3)_2$ solution. 30 ml of the waterglass solution used in Example 2 were added dropwise to this hardener solution. The solution was then heated and, after boiling for 20 minutes, 30 ml of a 2 m acetic acid were added, followed by boiling for another 15 minutes. Very hard hollow spheres with a smooth surface were formed.

EXAMPLE 6

The procedure was as in Example 5, except that the acetic acid was added after only 5 minutes' boiling. Under these conditions, the hollow spheres formed were again very hard and were still about half full of waterglass solution.

The hollow spheres were subjected to various expansion processes. The results are shown in Table 4. In series (a) to (c), the hollow spheres were tempered for 15 minutes at 300°, 400° and 600° C. Spherical foam bodies having a loose, partly porous surface were formed.

Examples (d) to (h) explain the addition of modifying components. They were varied both in regard to composition and in regard to quantity. The hollow spheres were continuously circulated during application of the modifying components thereby ensuring uniform coating. The hollow spheres were placed in wide trays, introduced into a preheated oven and tempered for 15 minutes. The expanded products formed were, once again, spherical foam bodies, but with a denser surface and high strength. They are water-resistant and floatable.

TABLE 4

| Test No. | Quantitative ratios | | Expansion temperature | Expanded product diameter | powder density | surface |
|---|---|---|---|---|---|---|
| | hollow spheres | modifying component | | | | |
| (a) | 3 g | — | 300° C. | 5–6 mm | 0.08 g/cc | loose |
| (b) | 3 g | — | 400° C. | 6 mm | 0.07 g/cc | porous |
| (c) | 3 g | — | 600° C. | 6–7 mm | 0.06 g/cc | |
| (d) | 30 g | 5 ml $H_3PO_4$ (85%) | 300° C. | 4.6–5.1 mm | 0.20 g/cc | firm, |
| (e) | 20 g | 1 ml $H_3PO_4$ (85%) | 400° C. | 5.1–5.4 mm | 0.17 g/cc | nonporous |
| (f) | 3 g | 0.3 ml $H_3PO_4$ (85%) | 300° C. | 4.5–4.7 mm | 0.18 g/cc | |
| (g) | 5 g | 0.6 g $H_3PO_4$ (85%) + | 300° C. | 5–6 mm | 0.15 g/cc | firm, |

TABLE 4-continued

| Test No. | Quantitative ratios hollow spheres | Quantitative ratios modifying component | Expansion temperature | Expanded product diameter | powder density | surface |
|---|---|---|---|---|---|---|
| (h) | 10 g | 0.6 g CaHPO$_4$.2 H$_2$O + 1.0 g H$_2$O 1.7 g MgCl$_2$.6 H$_2$O + 1.3 g H$_2$O | 300° C. | 4.5–5.5 mm | 0.16 g/cc | nonporous |

The preceding specific embodiments are illustrative of the practice of the invention. It is to be understood however, that other expedients known to those skilled in the art or disclosed herein may be employed without departing from the spirit of the invention or the scope of the appended claims.

We claim:

1. A process for the production of hollow, spherical bodies of solidified alkali metal silicates having the general formula $$M_2O:x.SiO_2$$

where M is an alkali metal and x has a value greater than 3.6 and less than 12, said hollow bodies having an external diameter of from 1 to 5 mm, shell thickness of from 0.2 to 0.6 mm, a water content of from 10% to 30% by weight and a solids content of at least 70% by weight, the M$_2$O content of the shell of said hollow bodies being greater internally and less toward the exterior surface consisting essentially of the steps of (1) introducing an alkali metal silicate solution dropwise into a solution of a water-soluble hardener for an alkali metal silicate solution where the ratio between the density of the alkali metal silicate solution and the density of the hardener solution is between 1.02 and 1.2, and the pH of said hardener solution is maintained between 4 and 10, (2) heat treating the solid product obtained in a solution of a hardener for an alkali metal silicate solution at a temperature in the range of from 103° C. to 120° C., and (3) separating and recovering said hollow spherical bodies of solidified alkali metal silicates.

2. The process of claim 1 wherein said heat treating is carried out at a temperature in the range of from 110° to 115° C.

3. The process of claim 1 wherein said solution of a hardener employed in the heat treating step is different from said solution of a hardener employed in said introducing step.

4. The process of claim 3 where both said solutions of a hardener contain water soluble calcium salts.

5. The process of claim 4 wherein said water soluble calcium salt is calcium chloride.

6. The process of claim 4 wherein said solutions of a hardener containing water soluble calcium salts contain lower carboxylic acids or derivatives thereof.

7. The process of claim 6 wherein said lower carboxylic acids or derivatives thereof is acetic acid.

8. The process of claim 1 wherein both said solutions of a hardener contain water soluble calcium salts.

9. The process of claim 8 wherein said water soluble calcium is calcium chloride.

10. The process of claim 8 wherein said solutions of a hardener containing water soluble calcium salts contain lower carboxylic acids or derivatives thereof.

11. The process of claim 10 wherein said lower carboxylic acids or derivatives thereof is acetic acid.

12. The process of claim 1, step 1, wherein the ratio by volume of said solution of a water-soluble hardener to said alkali metal silicate solution is selected whereby, on completion of the dropwise addition, the droplets obtained are still completely wetted by said hardener solution.

13. The process of claim 12, wherein said ratio by volume is beyond about 1:1.

14. A process for the production of hollow spherical bodies of solidified alkali metal silicates having the general formula $$M_2O:x.SiO_2$$

where M is an alkali metal and x has a value greater than 3.6 and less than 12, said hollow bodies having an external diameter of from 1 to 5 mm, shell thickness of from 0.2 to 0.6 mm, a water content of from 10% to 30% by weight and a solids content of at least 70% by weight, the M$_2$O content of the shell of said hollow bodies being greater internally and less toward the exterior surface, consisting essentially of the steps of introducing an alkali metal silicate solution having an SiO$_2$ content of from 25% to 34% by weight dropwise into a solution of a water soluble calcium salt hardener for an alkali metal silicate solution, where the ratio between the density of the alkali metal silicate solution and the density of the hardener solution is between 1.02 and 1.2 and the pH of said hardener solution is maintained between 4 and 10, heat treating the solid product obtained in a solution of a hardener for an alkali metal silicate solution at a temperature of at least 103° C., and separating and recovering said hollow spherical bodies of solidified alkali metal silicate.

15. The process of claim 14 wherein said solution of a hardener employed in the heat treating step is different from said solution of a hardener employed in said introducing step.

16. The process of claim 14, wherein the ratio by volume of said solution of a water-soluble calcium salt hardener into which said alkali metal silicate solution is introduced dropwise to said alkali metal silicate solution is selected whereby, on completion of the dropwise addition, the droplets obtained are still completely wetted by said hardener solution.

17. The process of claim 16, wherein said ratio by volume is beyond about 1:1.

* * * * *